(12) United States Patent
Ishida et al.

(10) Patent No.: US 6,229,231 B1
(45) Date of Patent: *May 8, 2001

(54) RECIPROCATING MOTOR HAVING CONTROLLABLE ROTOR POSITION

(75) Inventors: Takashi Ishida; Shigeru Ooki, both of Narashino (JP)

(73) Assignee: Seiko Seiki Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,586

(22) Filed: Nov. 5, 1997

(30) Foreign Application Priority Data

Nov. 6, 1996 (JP) .................................................... 8-308608
Feb. 19, 1997 (JP) .................................................... 9-050998

(51) Int. Cl.⁷ ............................ H02K 33/00; H02K 35/00
(52) U.S. Cl. .................................. 310/36; 310/12; 310/14; 310/15; 310/17
(58) Field of Search ........................ 310/12–36; 318/115, 318/119

(56) References Cited

U.S. PATENT DOCUMENTS

| | | | | |
|---|---|---|---|---|
| 4,463,300 | * | 7/1984 | Mayne et al. | 318/687 |
| 4,649,925 | * | 3/1987 | Dow et al. | 128/660 |
| 4,913,155 | * | 4/1990 | Dow et al. | 128/660 |
| 5,038,062 | * | 8/1991 | Shiraki | 310/39 |
| 5,161,361 | * | 11/1992 | Talley et al. | 57/264 |
| 5,284,411 | * | 2/1994 | Enomoto et al. | 414/217 |
| 5,338,121 | * | 8/1994 | Kobayashi et al. | 400/322 |
| 5,696,413 | * | 12/1997 | Woodbridge et al. | 310/15 |

* cited by examiner

Primary Examiner—Elvin Enad
(74) Attorney, Agent, or Firm—Adams & Wilks

(57) ABSTRACT

To provide a reciprocation motor capable to detect rotation angle of rotor accurately. Rotor 1 is a magnet having two poles to radial direction and comprises half-cylindrical magnets. Driving coils 5a and 5b are bound equally at coil board 3. Magnetic sensor 7 is fixed at outside and under side of driving coil 5b on coil board 3. Such a construction makes magnetic sensor hard to be influenced by flux generating caused by current flowing through driving coil 5b. Therefore, it is possible to improve position detecting accuracy of rotor 1.

13 Claims, 11 Drawing Sheets

RECIPROCATING MOTOR HAVING CONTROLLABLE ROTOR POSITION

BACKGROUND OF THE INVENTION

The invention relates to a reciprocation motor, and, more particularly, to means capable of detecting the rotation angle of a reciprocating rotor accurately.

Figure 14:
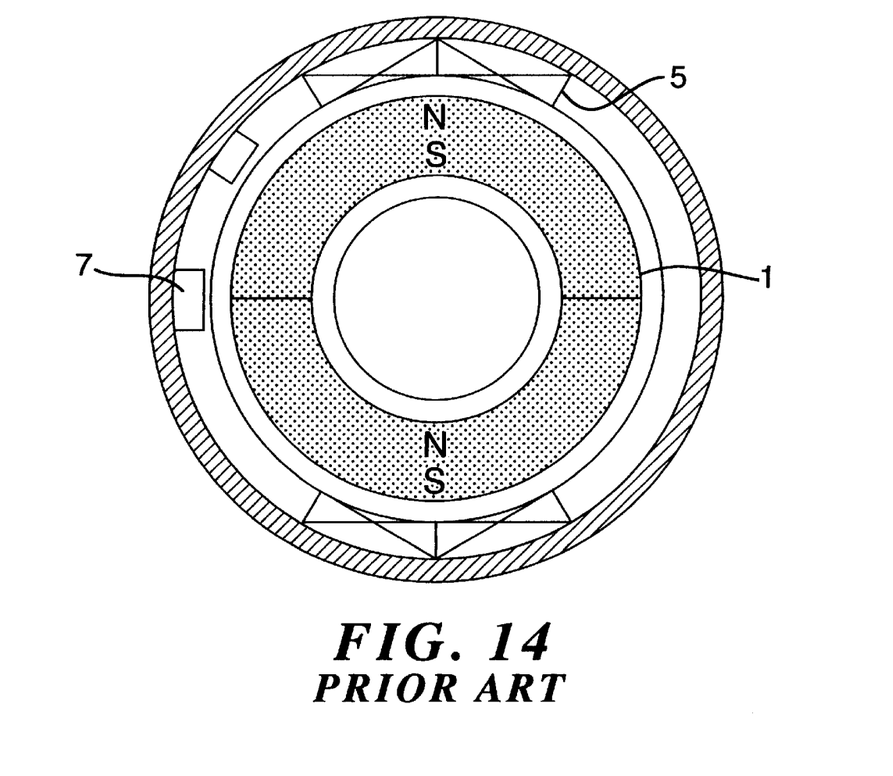
FIG. 14 is a transverse cross section of the prior art reciprocation motor.
Figure 15:
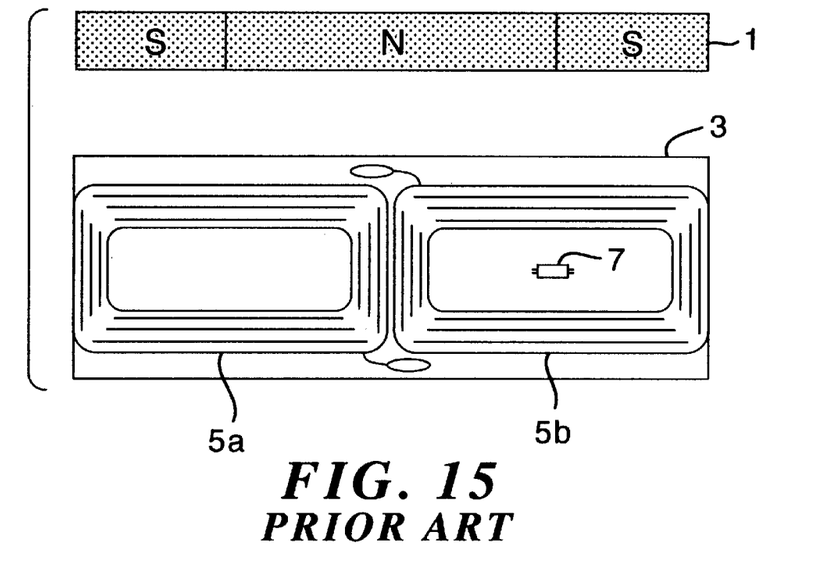
FIG. 15 is a view where the reciprocation motor of FIG. 14 is spread in plan view.

A reciprocation motor is already known in which control of the rotation angle of a rotor can be freely made. A transverse sectional view of this prior art reciprocation motor is shown in FIG. 14. Rotor 1 is a cylindrically-shaped magnet having two poles spaced apart in a radial direction thereof and comprises a pair of half-cylindrical magnets. One end of the magnet is formed so as to be an N pole, and other end is formed so as to be an S pole. FIG. 15 shows a view where the reciprocation motor of FIG. 14 is spread out in a plan view. Driving coils 5a and 5b are wound equally on coil board 3. Magnetic sensor 7 is centrally fixed inside the driving coil 5b on coil board 3. Magnetic sensor 7 may comprise, for example, a Hall element capable of converting magnetic flux to voltage.

Figure 16:
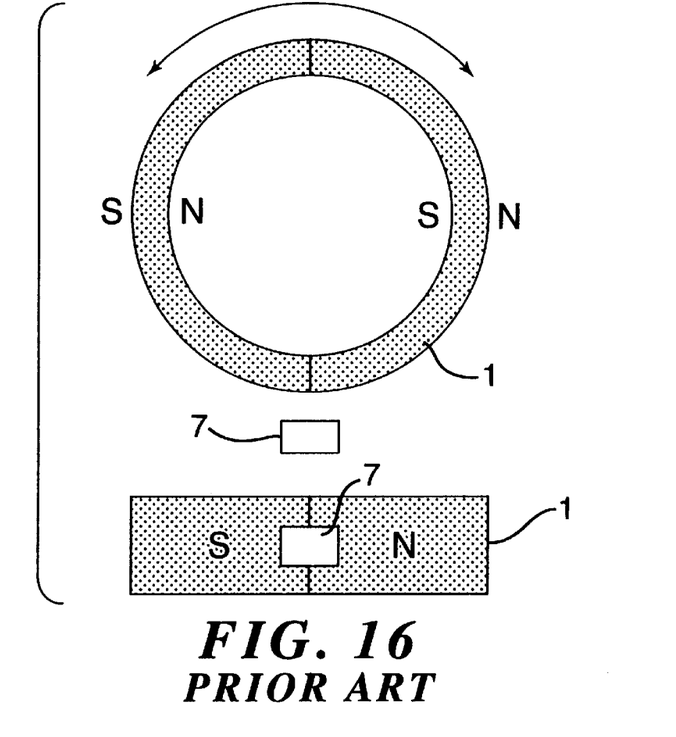
FIG. 16 is a view showing reciprocation state of the reciprocation motor and FIG. 17 is a view showing an output signal of a magnetic sensor caused by reciprocation.
Figure 17:
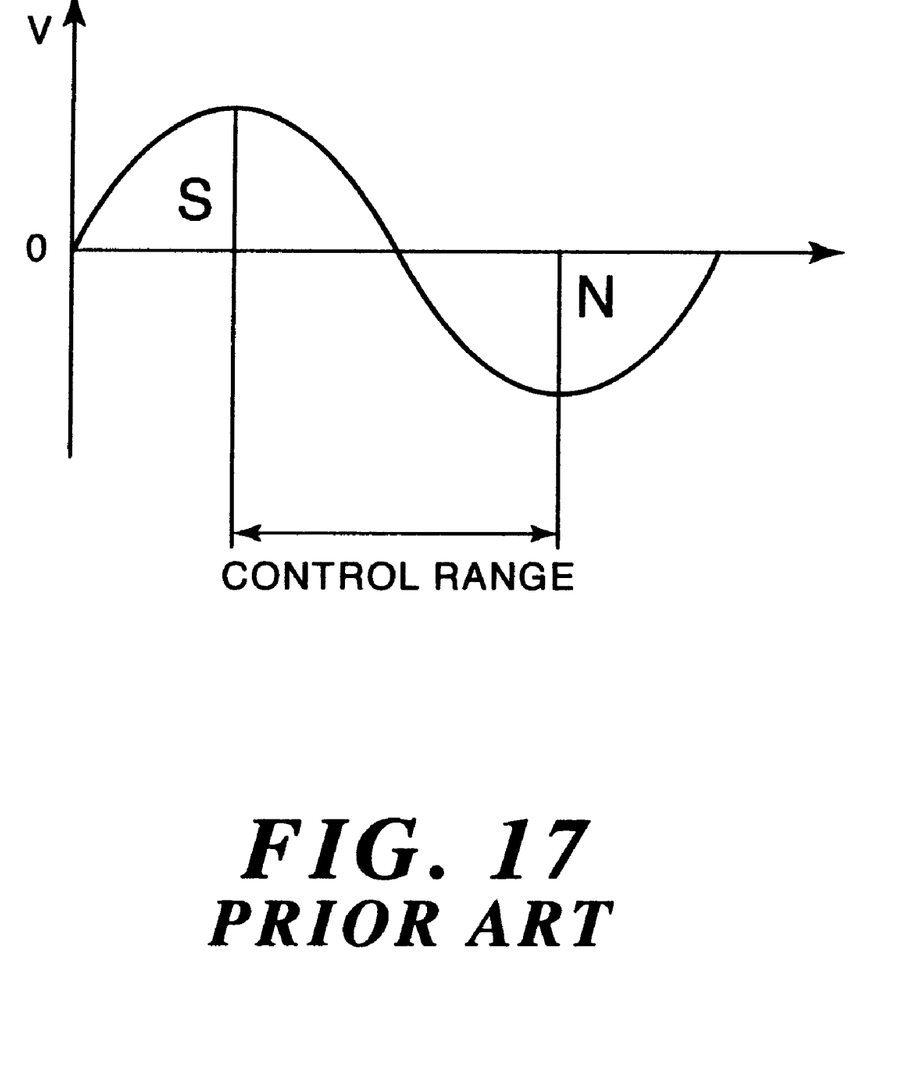

Next, the operation will be described. When current flows through driving coils 5a and 5b, torque occurs between driving coils 5a, 5b and the magnet of rotor 1. When current is maintained at a predetermined value, rotor 1 stops. When driving coils 5a and 5b are connected in series, and alternating current flows through time, it is possible to cause reciprocating motion through 180 degrees. Although two driving coils 5a and 5b are shown in FIG. 15, the reciprocating range can be determined freely using one or plural driving coils. When rotor 1 reciprocates as shown in FIG. 16, an output shown in FIG. 17 is obtained from magnetic sensor 7. It is possible to obtain an output from magnetic sensor 7 nearly in proportion to the magnetic field. Therefore, it is possible to control the rotor 1 to stop at a desired position by adjusting the current of driving coil 5 so as to make the output signal from magnetic sensor 7 a predetermined value. It is possible to control reciprocating motion through a desired angular range by inputting an alternating signal from an oscillator, not shown, to driving coil 5.

Thus, by forming magnetic sensor 7 centrally at the inside of driving coil 5b this makes it possible to control current of the driving coil and to detect the position (angle) of rotor 1.

The prior art reciprocating motor is influenced by not only magnetic flux of magnet of rotor 1 but also magnetic flux of current flowing through driving coil 5b because the magnetic sensor 7 is formed centrally inside driving coil 5b. Therefore, there is a possibility that the position detecting accuracy of the rotor 1 is diminished.

In order to solve the prior art problem noted above, an object of the present invention is to provide a reciprocating motor capable of detecting the rotation angle of the rotor accurately.

SUMMARY OF THE INVENTION

The present invention comprises a reciprocating motor having a rotor having a magnet of two poles in the radial direction; at least one driving coil for reciprocating the rotor through a predetermined angular range, said driving coil being formed around said rotor leaving a small gap between the rotor and the driving coil; and one or more sensors for sensing at least one of the intensity of a magnetic field generated by the driving coil and the rotation angle of said rotor, being formed outside of said driving coil. The sensor(s) are formed outside of, i.e., disposed so as to be spaced apart from the driving coil because magnetic flux density produced by the driving coil is smaller outside than inside the driving coil. Therefore, the influence on the sensor(s) of current flowing through the driving coil is greatly reduced, and the magnetic flux of the magnet of the rotor is detected accurately. High detecting accuracy of the magnetic flux of the rotor causes high accuracy detection of the rotation angle of the rotor. As used herein, the term "outside of the driving coil" means spaced apart from the driving coil in any direction, such as up or down, right left of the driving coil.

Although the rotation angle of the rotor can be detected accurately avoiding the influence of current flowing through the driving coil, preferably at least one of said one or more sensors is formed at a center position along the length of each said driving coil in circumferential direction or in the main shaft direction of said each driving coil.

The sensor formed at the center position along the length of each said driving coil in the circumferential direction or in the main shaft direction makes it possible to control reciprocation after setting beforehand, except if the electric angle is near ±90 degrees (as used here, the "electric angle" is taken as zero degrees when the border of N and S poles of the rotor is at the same angle as the sensor).

Although the sensor(s) can be set outside of the driving coil and spaced far from the driving coil to avoid the influence of current flowing through the driving coil as much as possible, said sensor can alternatively be formed close to said driving coils.

The shaft length of the rotor of the above construction is shortest in the case that the sensor is formed above or under the driving coil.

Further, the present invention has a rotor having a magnet of at least two poles spaced apart in the radial direction, the rotor being formed so as to rotate freely; at least two driving coils for reciprocating said rotor through a predetermined angle range, the driving coils being formed around the rotor such that a small gap exists between the rotor and the driving coil at a predetermined interval; and a sensing means for sensing a rotation angle of said rotor, the sensing means being formed at one of a first area located between the driving coils along the circumferential direction of the rotor and a second area axially spaced from the first area.

The reason for forming the sensing means for sensing the rotation angle of the rotor at either of a first area between the driving coils along the circumferential direction of the rotor and a second area axially spaced from the first area is that the influence of the magnetic flux caused by current flowing through the driving coils is greatly reduced.

Moreover, the detecting means in a preferred embodiment, comprises a magnetic sensor formed at a position shifted by a predetermined angle from a center along the length of said driving coils in the circumferential direction to a direction of rotation of said rotor in said second area, and a detecting magnet formed at said rotor having at least two poles in the radial direction for the magnetic sensor to detect the rotation angle of said rotor, wherein said detecting magnet is formed at said rotor so that the border portion of poles of the detecting magnet is shifted said predetermined angle along the rotation direction of said rotor standardizing the border portion of poles of said magnet formed at said rotor.

Because of that, reducing influence to the magnetic flux caused by current flowing through the driving coils, the rotation angle of the rotor is detected accurately, and it is possible to control similarly as in the past.

DETAILED DESCRIPTION OF THE INVENTION

Figure 1:
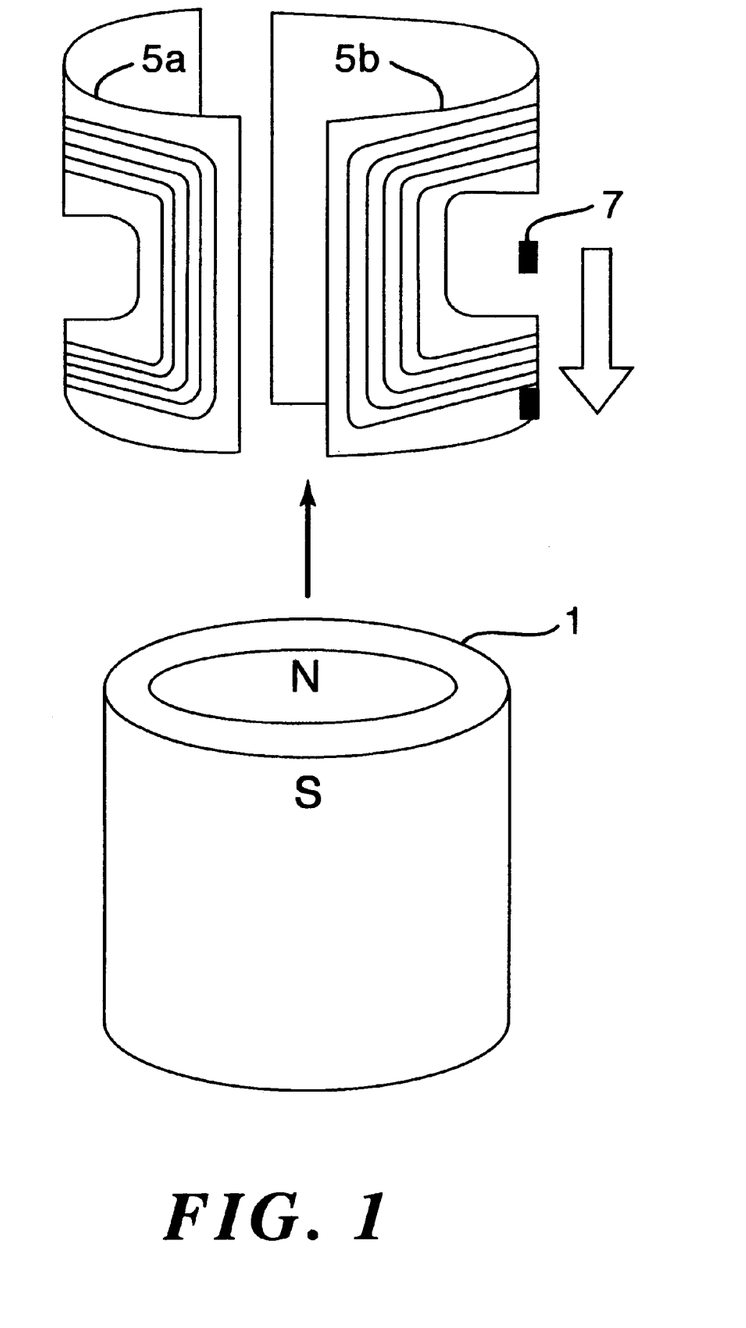
FIG. 1 is an explanatory diagram to make clear and simplify the difference of construction with the prior art.
Figure 2:
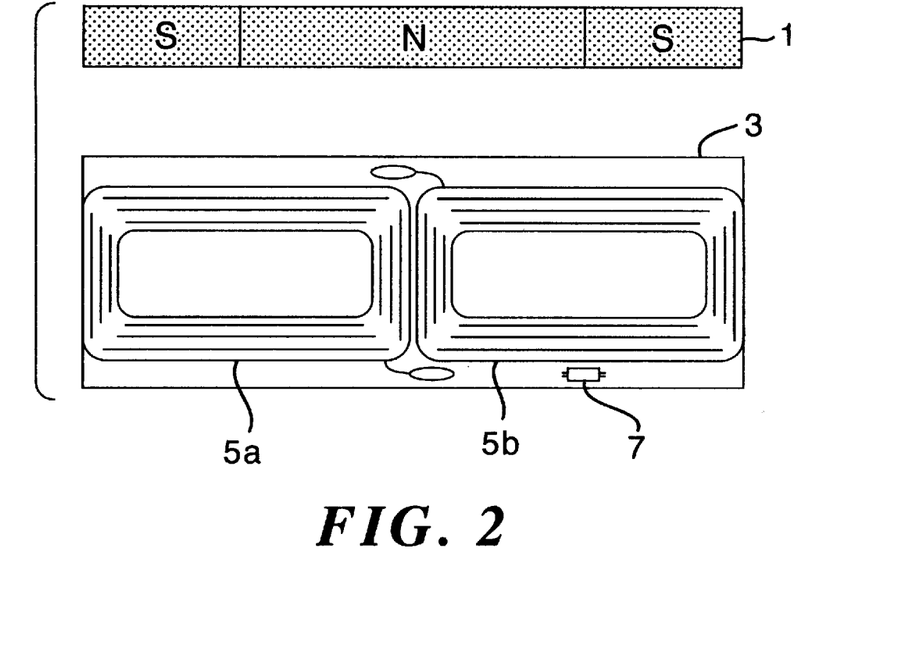
FIG. 2 is a spread construction view of the first embodiment of the present invention.

Referring to the figures, a first embodiment of the present invention will be described below. The first embodiment of the present invention is shown in FIGS. 1 and 2. FIG. 1 is an explanatory diagram to make clear and simplify the difference of construction from the prior art. FIG. 2 is a spread out construction view of the first embodiment of the present invention. Explanation of those elements corresponding to similar elements in FIGS. 14 and 15 is omitted and the same reference symbols are used.

In FIG. 1, coil board 3, not shown, is formed cylindrically. Driving coils 5a and 5b are wound in such a way that magnetic flux goes to the center direction of cylinder, and the coils 5a and 5b are fixed on coil board 3. Rotor 1 is assembled in the cylinder of coil board 3.

Next, operation of the first embodiment constructed above will be described. In FIG. 1, magnetic sensor 7, which was formed at the inside of driving coil 5b in the prior art, is instead disposed outside and under driving coil 5b as illustrated by the arrow. To be precise, the position where magnetic sensor 7 is formed is a center position of the circumferential length of driving coil 5b as shown in FIG. 2. Magnetic sensor 7 is formed separated by a small distance from driving coil 5b. If the wire of driving coil 5b is coated or isolated, the magnetic coil may be adjacent to the driving coil. Being formed outside of driving coil 5, magnetic sensor 7 is hardly influenced by magnetic flux generated by current flowing through driving coil 5b, because the magnetic flux density is smaller outside of driving coil 5b than inside. This improves the position detecting accuracy of rotor 1.

If the space between magnetic sensor 7 and driving coil 5 is large, the length of the shaft as lengthwise direction of the rotor 1 should be increased to correspond to magnetic sensor 7. This ensures that there is sufficient magnetic flux caused by the magnet of the rotor 1. Forming magnetic sensor 7 at a center position along the length of driving coil 5b in the circumference direction can keep the initial state of the rotation angle at zero degrees when the rotation angle of rotor 1 is controlled. Forming magnetic sensor 7 at a center position of driving coil 5b in the main axis direction can keep the initial state of rotation angle at 90 degrees. Thus it becomes easy to make the mechanical angle of rotor 1 correspond to the electric angle. Although in this example magnetic sensor 7 is shifted on the underside of driving coil 5b, it may be moved to the upper side as well because the same condition exists, e.g., that the magnetic sensor is hardly influenced by magnetic flux caused by driving coil 5b. Although magnetic sensor 7 is at the upper or under side of rotor 1 where magnetic flux is low, it is still possible to detect magnetic flux of rotor 1 as in the prior art. If sufficient current to drive rotor 1 flows through driving coils 5a and 5b, rotor 1 turns and control of the rotor position corresponding to a command signal becomes possible.

In accordance with the first embodiment of the present invention described above, the actual advantage of the present invention compared to the prior art will now be described.

Figure 3:
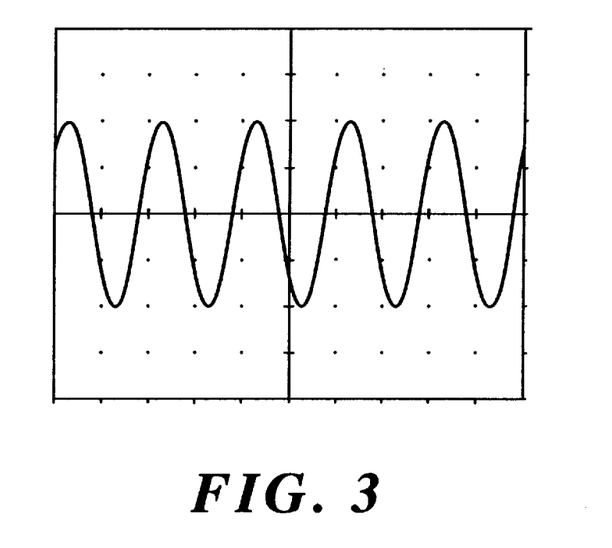
FIG. 3 is a view showing a driving wave form input to the driving coil.
Figure 4:
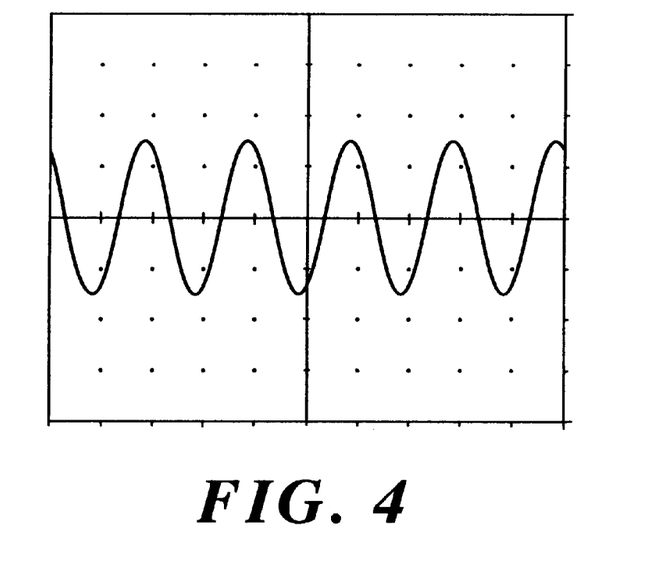
FIG. 4 is a view showing an output signal of a magnet sensor according to the prior construction.
Figure 5:
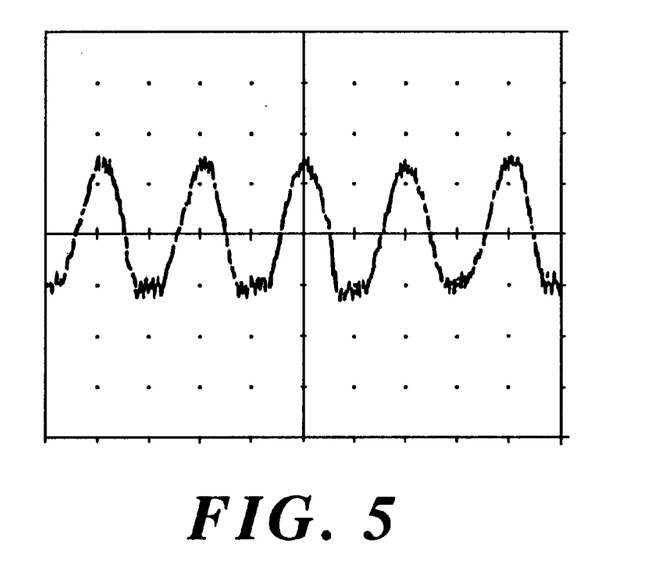
FIG. 5 is a view showing an output signal of a magnet sensor according to the embodiment of the present invention.

FIG. 3 shows a driving wave form input to driving coil 5. The horizontal axis shows time graduated in 50 msec intervals. The vertical axis shows voltage graduated in 2 V intervals. FIG. 4 shows the output of the prior art magnetic sensor 7, which is formed inside of driving coil 5b. This time the horizontal axis shows voltage graduated in 0.2 V intervals. FIG. 5 shows the output signal of magnetic sensor 7 when magnet sensor 7 of the embodiment of the invention is formed as in FIG. 2. This time the horizontal axis shows voltage graduated in 10 mV intervals. As can be seen from these measurements, in this embodiment of the present invention the influence of magnetic flux caused by driving coil 5 is reduced to about one twentieth of that in the prior art.

Figure 6:
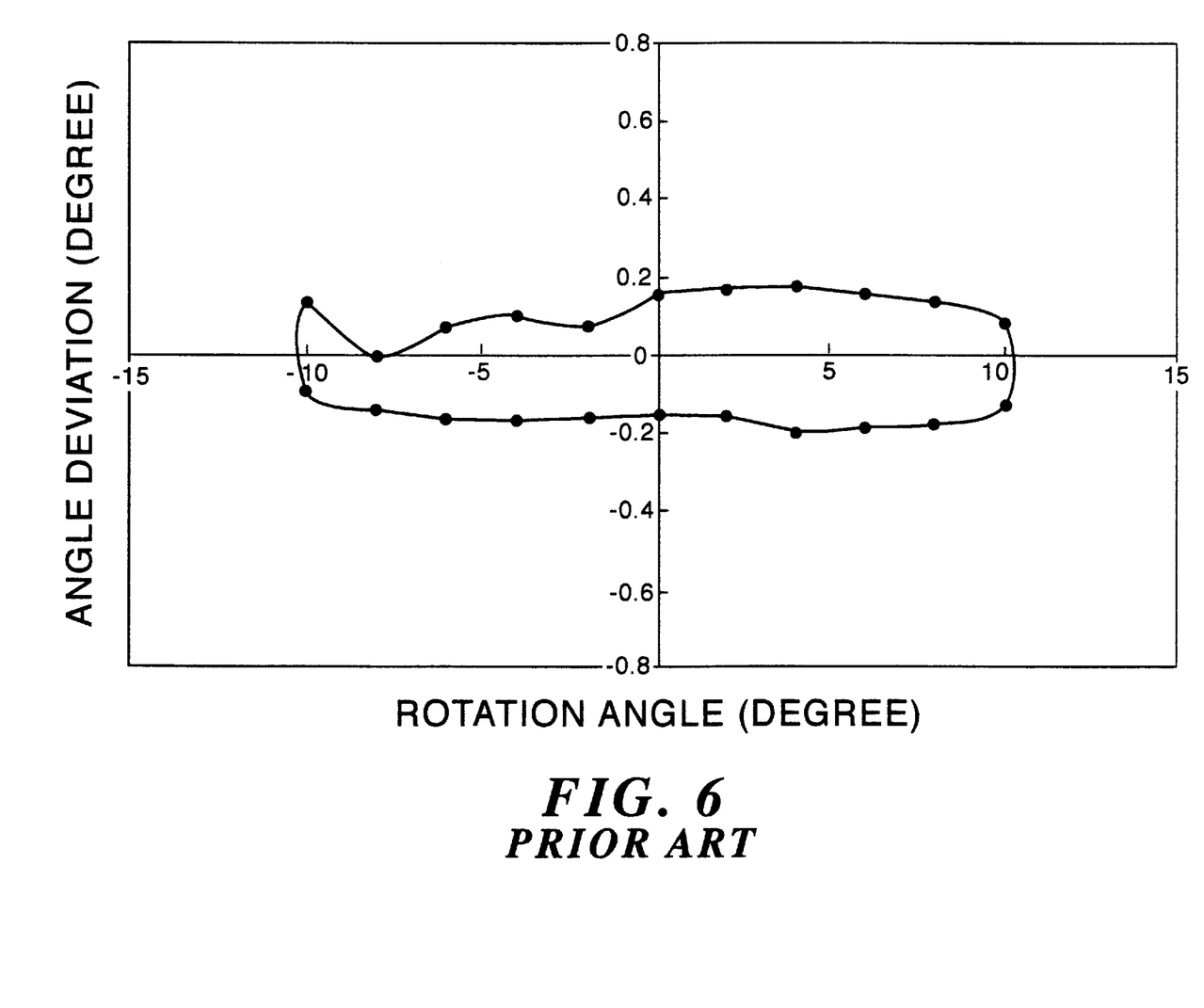
FIG. 6 is a view showing a Lissajous figure of rotation angle and angle deviation according to the prior art construction.
Figure 7:
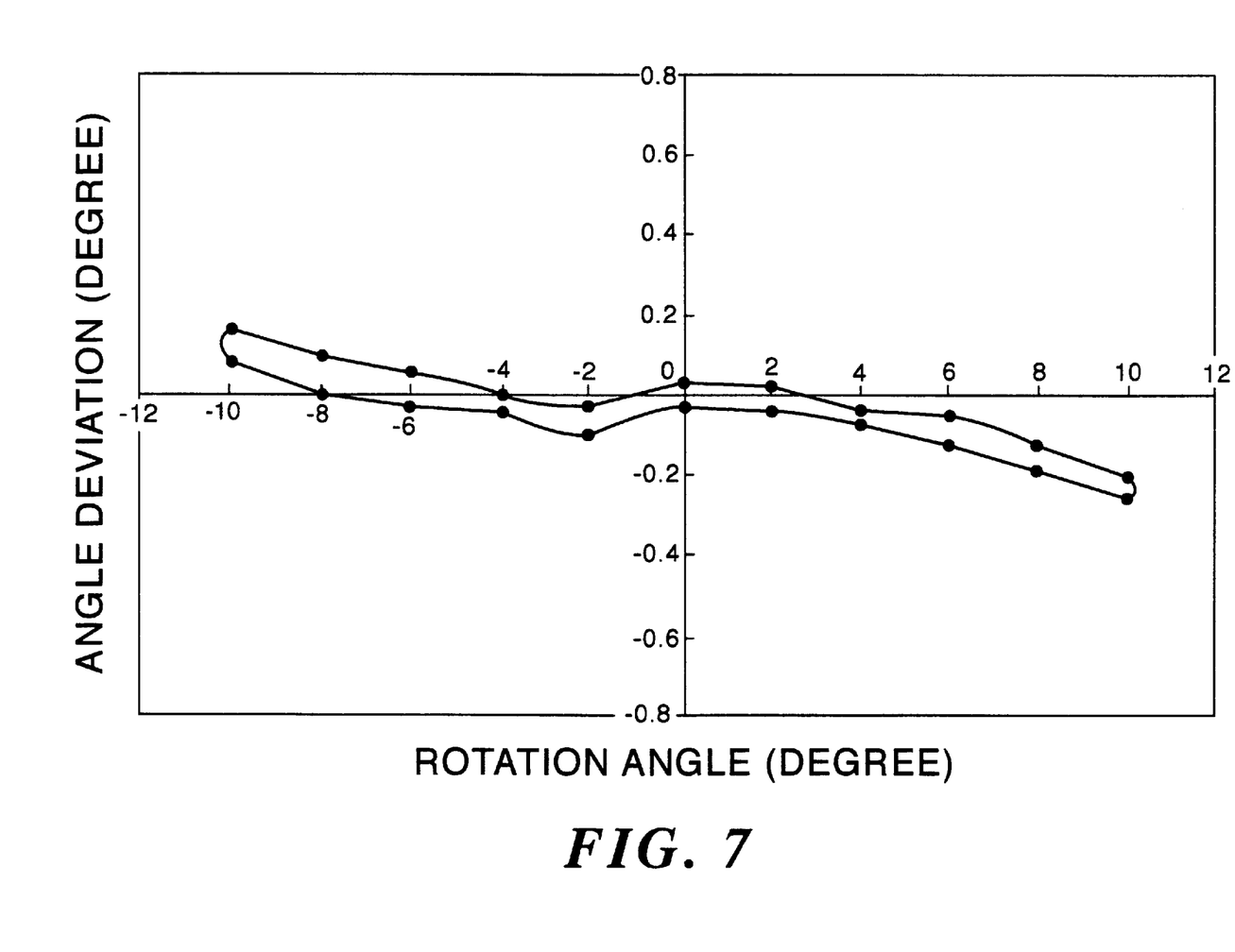
FIG. 7 is a view showing a Lissajous figure of rotation angle and angle deviation according to the first embodiment of the present invention.

FIGS. 6 and 7 show Lissajous figures of the rotation angle and the angle deviation when the prior art construction of FIG. 15 and the embodiment of the present invention shown in FIG. 2 are applied to control a reciprocation motor. FIG. 6 shows the Lissajous figure of rotation angle and angle deviation according to the prior art construction. It shows that hysteresis occurs at about 0.4 degrees when rotor 1 is turned through 10 degrees. FIG. 7 shows a Lissajous figure of rotation angle and angle deviation according to the embodiment of the present invention. It shows that hysteresis is about 0.05 degrees at the same condition and decreases to about one eighth of that in the prior art. This hysterisis phenomenon occurs because the direction of the current in driving coil 5 changes.

Figure 8:
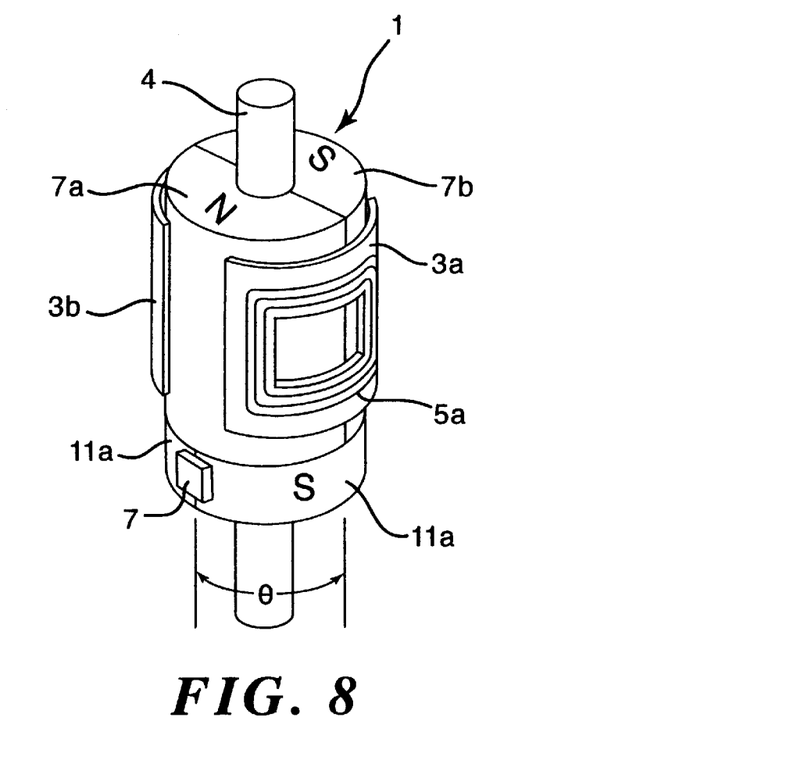
FIG. 8 is a perspective view showing the construction of the second embodiment of the present invention, where a case and bearings are omitted.
Figure 9:
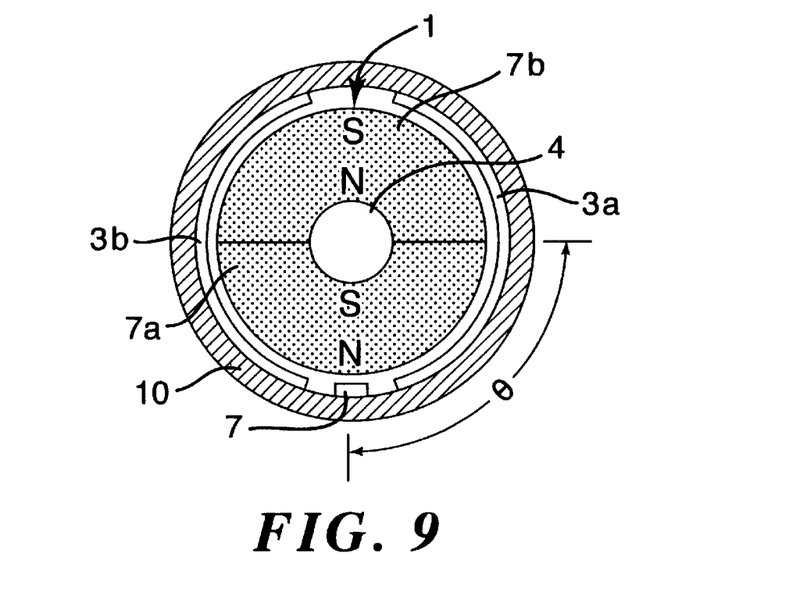
FIG. 9 is a sectional view of the second embodiment of the present invention, where a case is formed.
Figure 10:
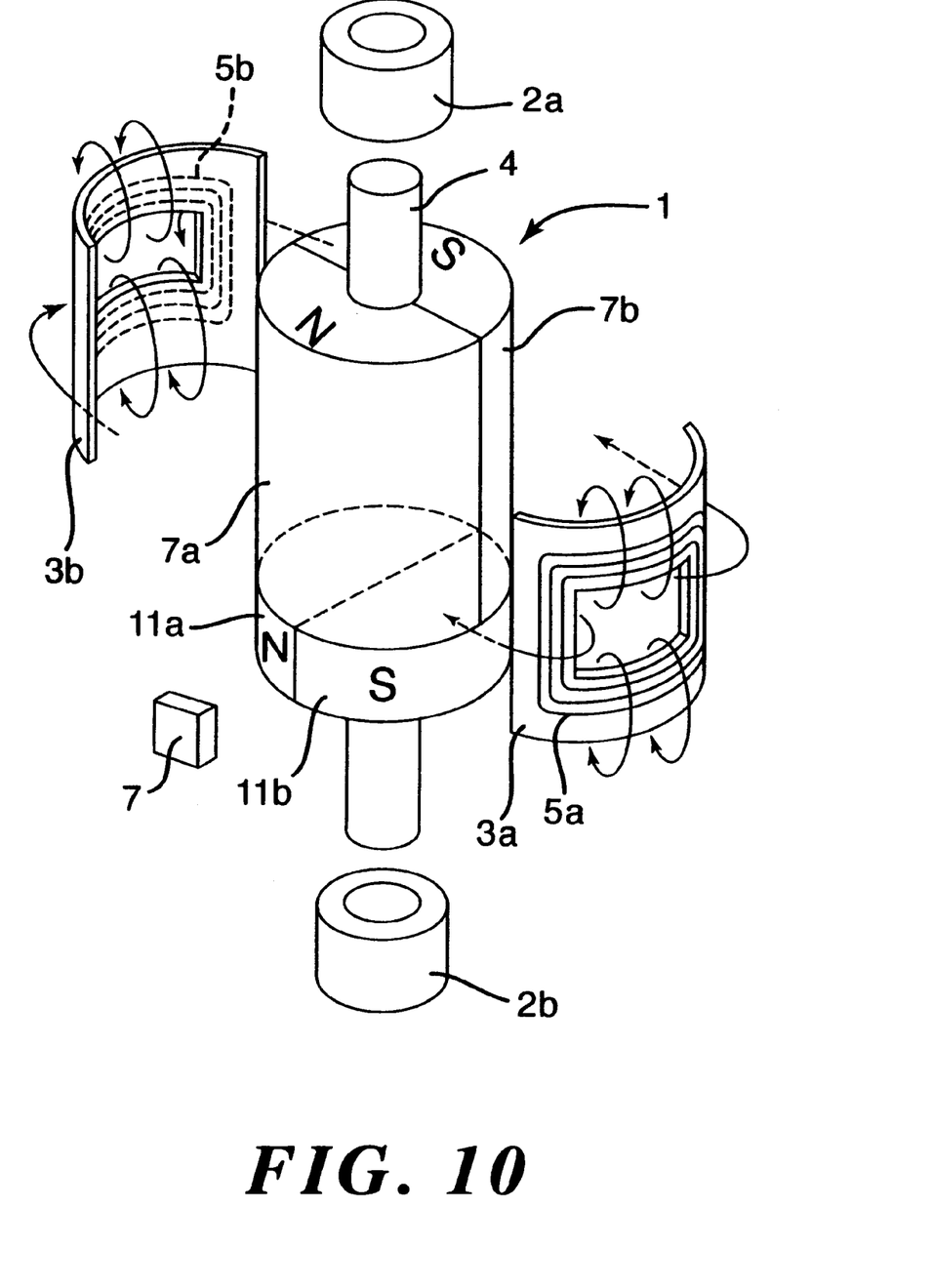
FIG. 10 is an exploded perspective view of the second embodiment where a case is omitted.
Figure 11:
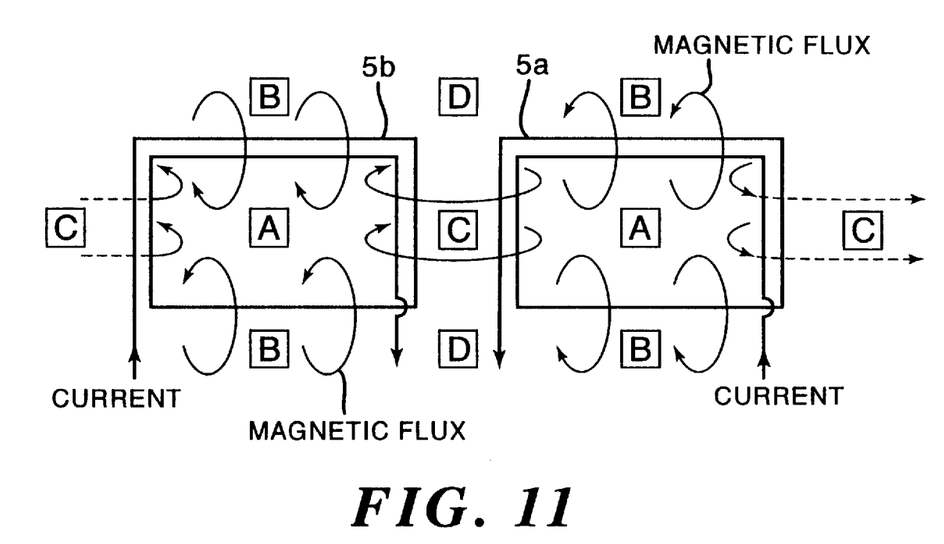
FIG. 11 is a spread view where driving coils are spread in plan view.

Next, a second embodiment will be described referring to FIGS. 8 to 11. FIG. 8 is a perspective view showing the construction of the second embodiment, where a case and bearings are omitted. FIG. 9 is a sectional view of the second embodiment of the present invention, where a case is formed. FIG. 10 is an exploded perspective view of the second embodiment where a case is omitted. FIG. 11 is a spread view where driving coils are spread in plan view.

The second embodiment, as shown in the figure, has rotor 1 supported by bearings 2a and 2b, and driving coils 5a and 5b for reciprocating rotor 1 through a predetermined angle range, these being formed around rotor 1 leaving a space between the rotor and the driving coil.

Rotor 1, as shown in the figure, comprises rotor axis 4 and two driving magnets 7a and 7b formed at rotor axis 4, and both edges of rotor axis 4 are supported so as to rotate freely by bearings 2a and 2b.

Magnets 7a and 7b are each constructed in half cylindrical shape having a predetermined thickness so that they take on cylindrical shape when they are formed at rotor axis 4. Magnets 7a and 7b are constructed so as to have two poles as a whole, that is, the outer circumferential side of magnet 7a is N pole, and that of magnet 7b is S pole.

Driving coils 5a and 5b are air-core coils wound equally, and are fixed at flexible coil boards 3a and 3b for example. The coil boards 3a and 3b are formed inside of cylindrical case 10 facing with rotor 1 so that magnetic flux caused by driving coils 5a and 5b faces the rotor 1.

Driving coils 5a and 5b may be fixed inside of cylindrical case 10 facing the rotor 1 by a suitable means such as an adhesive so that the magnetic flux faces the rotor 1 and is not fixed at coil boards 3a and 3b.

Next, a position where magnetic sensor 7 of the second embodiment is arranged will be described.

When current flows through driving coils 5a and 5b, magnetic flux caused by the current is shown in FIGS. 10 and 11.

Because of this flux, magnetic sensor 7 can not detect accurately the magnetic flux caused by magnets 7a and 7b of the rotor 1 since the influence of generating magnetic flux is largest in area A of inside the driving coils 5a or 5b.

Even outside of driving coils 5a or 5b, at an area B of upper or lower region, the influence of generating magnetic flux is smaller than in the area A. Because of that, in the area B, the magnetic flux detecting accuracy of magnets 7a and 7b of rotor 1 detected by magnetic sensor 7 improves over that in area A, though it is worse than areas C and D described later.

Magnetic flux caused by driving coils 5a and 5b is generated along the circumferential direction as a whole at area C which is the area at the left and right side, respectively, at the outside of driving coils 5a and 5b. Since the detecting face of magnetic sensor 7 is similar in direction to the circumferential direction and the magnetic sensor does not intersect the detecting face of magnetic sensor 7, magnetic sensor 7 can detect the magnetic flux of magnet 7a or 7b of rotor 1. However switching position and positive and negative of rotation direction of the rotor 1 can not be obtained or known because the detecting face of magnetic sensor 7 can not detect the border portion between magnets 7a and 7b.

On the other hand, at area D which is the second area far from area C which is at the left and right side at the outside of the driving coils 5a and 5b along the axial direction of the rotor 1, the rotation angle of rotor 1 can be detected with high accuracy by the following construction, since the influence of magnetic flux caused by driving coils 5a and 5b is small and the magnetic sensor does not intersect the detecting face of magnetic sensor 7 as it does at area C.

In the second embodiment, magnet sensor 7 is formed in the area D as shown in FIGS. 8 and 9, and detecting magnets 11a and 11b having two poles along the radial direction, in addition to magnets 7a and 7b of rotor 1, are formed at the lower side of rotor axis 4 to detect the rotation angle of rotor 1 using magnetic sensor 7. Thus the detecting face of magnetic sensor 7 faces detecting magnets 11a and 11b.

In this construction, in order to be able to control rotation of rotor 1 standardizing the center of the circumferential direction of driving coil 5a like as in the past, detecting magnets 11a and 11b formed at magnetic sensor 7 and rotor axis 4 have the following relation:

Magnetic sensor 7 is formed at a position in area D of FIG. 11, and the position is shifted by $\theta$ degrees (90 degrees in the example) from the center of the circumferential direction of driving coil 5a along the circumferential direction as shown in FIGS. 8 and 9. Because of the shift of $\theta$ degrees, detecting magnets 11a and 11b are formed at rotor axis 4 so that the border portion between detecting magnets 11a and 11b is set at the position shifted $\theta$ degrees along the circumferential direction standardizing or normalizing the border portion between magnets 7a and 7b formed at rotor 4.

Here, magnetic sensor 7 is formed at the position shifted 90 degrees from the center of the circumferential direction of driving coils 5a since rotor 1 has two poles and two coils. However, magnetic sensor 7 is formed generally at the position of ½ of the interval between the driving coils. For example, when a rotor has four poles and four coils, ½ of the interval is 45 degrees.

The magnetic sensor is formed at such a position because influence of the magnetic flux is caused by current flowing through driving coils 5a and 5b.

In the second embodiment described above, magnetic sensor 7 is not influenced by the magnetic flux of driving coils 5a and 5b, moreover the detecting face of magnetic sensor 7 detects the magnetic flux of detecting magnets 11a and 11b.

Output of the magnetic sensor 7 becomes zero when the detecting face faces the border portion between detecting magnets 11a and 11b, and becomes positive, for example, when the detecting face faces detecting magnet 11a, and becomes negative when the detecting face faces detecting magnet 11b. Because of that, positive or negative rotation angle of rotor 1 is obtained from the output signal of magnetic sensor as the center of the border.

Based on the output signal, letting enough current flow through driving coils 5a and 5b for driving rotor 1 makes it possible to rotate the rotor 1 and to control the position of the rotor 1 according to a command signal. The sequence of these controls is carried out by a control circuit not shown.

Next, the third embodiment of the present invention will be described with reference to FIGS. 12 and 13.

Figure 12:
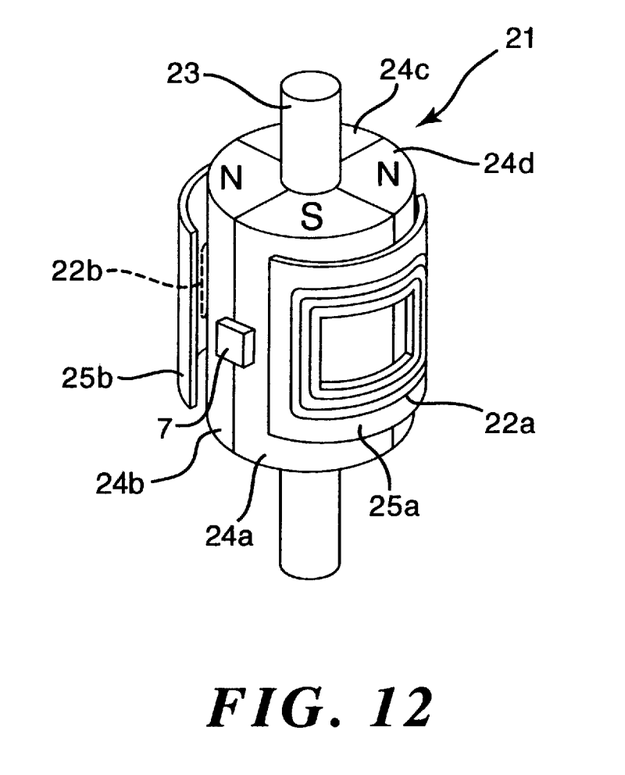
FIG. 12 is a perspective view showing the construction of the third embodiment, where a case and bearings are omitted.
Figure 13:
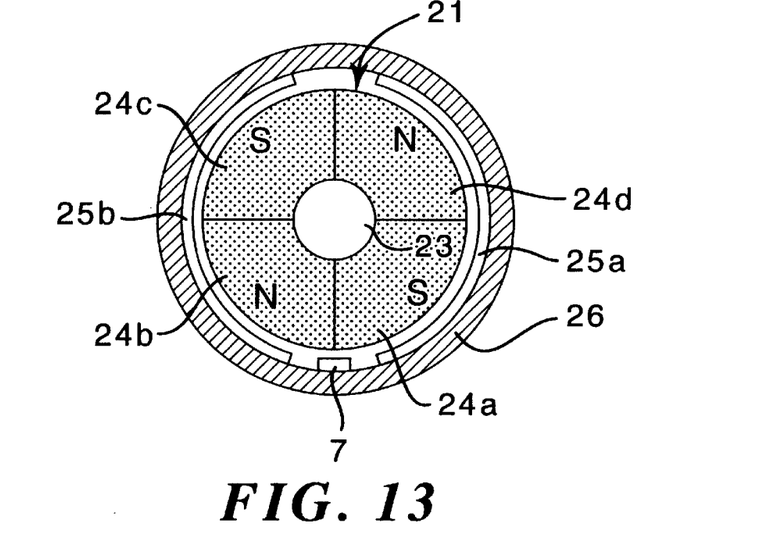
FIG. 13 is a sectional view of the third embodiment, where a case is formed.

FIG. 12 is a perspective view showing the construction of the third embodiment, where a case and bearings are omitted. FIG. 13 is a sectional view of the third embodiment, where a case is formed.

In the third embodiment, rotor 1 having two poles of the second embodiment is replaced with rotor 21 having four poles as shown in the figure.

That is, the third embodiment comprises a rotor 21 having four poles and driving coils 22a and 22b are formed around rotor 21 leaving a little space for reciprocating rotor 21 through a predetermined angle range.

Rotor 21, as shown in the figure, comprises rotor axis 23 and four magnets 24a to 24d formed at rotor 23 in radial shape, and both ends of rotor axis 23 are supported so as to rotate freely by bearings not shown. Driving coils 22a and 22b are air-core coils wound equally, and are fixed at flexible coil boards 25a and 25b for example. The coil boards 25a and 25b are formed inside of cylindrical case 26 facing the rotor 21 so that magnetic flux caused by driving coils 22a and 22b faces the rotor 21.

Driving coils 22a and 22b may be fixed inside of cylindrical case 26 facing the rotor 21 by a suitable means such as an adhesive so that the magnetic flux faces the rotor 21 and is not fixed at coil boards 25a and 25b.

In the third embodiment, magnetic sensor 7 is formed at the middle position of the interval between driving coils 22a and 22b (the position shifted 90 degrees from the arranged direction of the driving coil 22a in the rotating direction of the rotor 21) and at the middle position in the longitudinal or axial direction of magnets 24a–24d. Thus the detecting face of magnetic senor 7 faces detecting magnets 24a and 24b.

Since the position is in area C of FIG. 11 and the magnetic flux caused by driving coils 22a and 22b does not intersect the detecting face of magnetic sensor 7, and the magnet of rotor 21 has four poles in the third embodiment, the border portion between magnets 24a and 24b is detected by magnetic sensor 7 differing from the second embodiment. By the result of the detection, the rotation angle of rotor 21 is obtained or known.

In the above second embodiment, a case is described, where magnetic sensor 7 is formed in area D of FIG. 11 and detects the rotation angle of rotor 1 using detecting magnets 11a and 11b formed especially.

However, when it is not necessary to obtain the positive or negative direction of rotation of rotor 1 from the output of magnetic sensor 7, magnetic sensor 7 may be formed at the position of area C of FIG. 11.

In that case, detecting magnets 11a and 11b are not needed because the condition of rotor 1 is obtained from output value, increase, decrease, maximum value and so on of output of magnetic sensor 7.

As described above, according to the present invention, the sensor is formed outside of the driving coil and so is hardly influenced by the magnetic flux generating by current flowing through the driving coil. Therefore, the position detecting accuracy of the rotor is improved.

According to the present invention, a sensor formed at a center position along the length of the driving coil in the circumferential direction or in the main shaft direction makes it possible to control reciprocation after setting beforehand, except when the electric angle is near ±90 degrees.

According to the present invention, forming the sensor near the driving coil makes it possible to minimize the shaft length.

Since the detecting means for detecting the rotation angle of the rotor is formed at the middle position of the interval between the driving coils and at the predetermined position along the axial direction of said rotor in the present invention, influence of magnetic flux caused by current flowing through the driving coils is extremely reduced.

Moreover, in the present invention, the detecting means for detecting the rotation angle of the rotor comprises the magnetic sensor formed at lower side along the axial direction of the rotor in the position shifted 90 degrees along the arranged direction from the arranged position of the driving coil and the detecting magnet is formed at the rotor being shifted 90 degrees from the magnet of the rotor in order that the magnetic sensor detects the rotation angle of the rotor. Because of that, influence of the magnetic flux caused current flowing through the driving coils is extremely reduced, besides the rotation angle of the rotor is detected accurately.

What is claimed is:

1. A reciprocation motor having a rotor for undergoing reciprocal angular motion, comprising:

a rotatably supported main shaft;

a rotor fixed to the main shaft and having a cylindrical magnet portion magnetized in a radial direction thereof such that 2n magnetic poles are formed therein, wherein n is an integer;

at least one driving coil for reciprocally driving the rotor through a predetermined angular range, the at least one driving coil being formed around the circumference of the rotor; and one or more magnetic sensors for sensing a magnitude of a magnetic field emanating from the magnet portion of the rotor to determine an angular position of the rotor, each magnetic sensor being disposed at a location in the motor at which it is not substantially affected by a magnetic field produced by the driving coil.

2. A reciprocation motor according to claim 1; wherein the at least one driving coil comprises a plurality of driving coils arranged around the circumference of the rotor, each driving coil having a predetermined length extending in the direction of the circumference of the rotor and a predetermined width extending in the axial direction of the rotor, and at least one of the one or more sensors is disposed circumferentially between two driving coils and is located at an axial position that is either within the axial width of the two driving coils or outside the axial width of the two driving coils.

3. A reciprocation motor according to claim 1; wherein said one or more sensors are disposed close to said at least one driving coil so that the axial length of the rotor may be minimized.

4. A reciprocation motor according to claim 1; further comprising a cylindrical magnet supported adjacent the rotor in an axial direction of the shaft for undergoing angular movement with the rotor, the magnet having a first circumferential portion having a first pole extending in a radial direction thereof and having a second circumferential portion having a second pole extending in a radial direction thereof, the first circumferential portion and the second circumferential portion being adjoined together to create an interface between the first and second poles, the interface being disposed at a predetermined angle with respect to a center of a driving coil so that a reference angular position of the motor can be set.

5. A reciprocation motor comprising:

an angularly displaceable rotor having a cylindrical magnet portion having at least two poles spaced apart in the radial direction thereof, the rotor being disposed so as to rotate freely in response to an applied torque;

at least two driving coils disposed proximate the magnet portion for reciprocally driving the rotor through a predetermined angular range, the driving coils being formed around the circumference of the cylindrical magnet portion of the rotor with a gap between the rotor and each driving coil and each coil being spaced by a predetermined interval; and sensing means for sensing a rotation angle of the rotor, the sensing means being disposed at an area displaced in the axial direction of the rotor and at a predetermined interval between a pair of driving coils along the circumferential direction of the rotor;

wherein the sensing means comprises a magnetic sensor disposed 90° from a center of the driving coils in the circumferential direction of the rotor in the second area, and a cylindrical detecting magnet disposed adjacent the rotor and having at least two poles in the radial direction thereof to enable the magnetic sensor to detect the rotation angle of the rotor; and wherein the detecting magnet is disposed so that a border portion of poles of the detecting magnet is shifted 90° along the rotation direction of the rotor.

6. A reciprocation motor having a rotor for undergoing controllable reciprocable angular motion, the motor comprising:

a rotatably supported main shaft;

a rotor fixed to the main shaft, the rotor having a magnet portion having at least two magnetic poles;

at least two driving coils for reciprocally driving the rotor through a predetermined angular range, each driving coil being arranged around the circumference of the rotor and being spaced from an adjacent driving coil by a predetermined interval; and detecting means for producing an output signal in response to an input magnetic flux representing a rotational position of the rotor, the detecting means being disposed in one of a first area between two adjacent driving coils and a second area spaced from the first area in the axial direction of the rotor, so that the detecting means is not substantially affected by a magnetic field produced by the driving coils to drive the rotor.

7. A reciprocation motor according to claim 6; wherein the detecting means comprises a magnetic sensor disposed in the second area so as to be located at a position shifted by a predetermined angle from a center of the driving coils in the circumferential direction to a direction of rotation of the rotor; and a cylindrical detecting magnet having at least two magnetic poles extending in the radial direction thereof, the detecting magnet being mounted axially adjacent to the rotor so as to cooperate with the magnetic sensor to develop the electric output signal; wherein the detecting magnet is arranged so that a border portion of the magnetic poles of the detecting magnet is shifted by the predetermined angle along the direction of rotation of the rotor.

8. A reciprocation motor according to claim 6; further comprising a cylindrical magnet supported adjacent the rotor in an axial direction of the main shaft for undergoing angular movement with the rotor, the magnet having a first circumferential portion having a first pole extending in a radial direction thereof and having a second circumferential portion having a second pole extending in a radial direction thereof, the first circumferential portion and the second circumferential portion being adjoined together to create an interface between the fist and second poles, the interface being disposed at a predetermined angle with respect to a center of a driving coil so that a reference angular position of the motor can be set.

9. In a reciprocation motor having a cylindrical rotor supported by a cylindrical driving shaft for undergoing reciprocal angular motion, the combination comprising:

at least one driving coil for reciprocally driving the rotor through a predetermined angular range, the at least one driving coil being formed around the circumference of the rotor and being spaced therefrom by a predetermined gap;

a cylindrical magnet supported adjacent the rotor in an axial direction of the shaft for undergoing angular movement with the rotor, the magnet having a first circumferential portion having a first pole extending in a radial direction thereof and having a second circumferential portion having a second pole extending in a radial direction thereof; and a magnetic sensor for sensing a magnitude of a magnetic field emanating from the cylindrical magnet to determine an angular position of the cylindrical magnet so that the angular position of the rotor can be determined, the magnetic sensor being mounted in the motor adjacent to the cylindrical magnet and spaced from the rotor in the axial direction of the shaft so that the magnetic sensor is substantially unaffected by a magnetic field generated by the driving coils.

10. A reciprocation motor according to claim 9; wherein the at least one driving coil comprises a plurality of driving coils arranged around the circumference of the rotor, each driving coil having a predetermined length extending in the direction of the circumference of the rotor and a predetermined width extending in the axial direction of the rotor, and wherein the first circumferential portion of the cylindrical magnet and the second circumferential portion of the cylindrical magnet are adjoined together to create an interface between the fist and second poles, the interface being disposed at a predetermined angle with respect to a center of the predetermined length of a driving coil so that a reference angular position of the motor can be set.

11. A reciprocation motor according to claim 9; wherein the at least one driving coil comprises a plurality of driving coils arranged around the circumference of the rotor, each driving coil having a predetermined length extending in the direction of the circumference of the rotor and a predetermined width extending in the axial direction of the rotor, and the magnetic sensor is disposed circumferentially between two driving coils and an axial position that is outside the axial width of the two driving coils.

12. A reciprocation motor according to claim 9; wherein the at least one driving coil comprises a plurality of driving coils arranged around the circumference of the rotor, each driving coil having a predetermined length extending in the direction of the circumference of the rotor and a predetermined width extending in the axial direction of the shaft and the rotor, and the magnetic sensor is disposed at the center of the predetermined length of one of the driving coils and at an position spaced from the driving coils in the axial direction of the shaft, so that the magnetic sensor detects a magnetic field of the rotor and is substantially unaffected by a magnetic field generated by the driving coils.

13. A reciprocation motor according to claim 9; wherein the magnetic sensor is disposed closely adjacent to the at least one driving coil in the axial direction of the shaft so that the axial length of the rotor may be minimized.

* * * * *